US006999616B2

(12) United States Patent
Nacken

(10) Patent No.: US 6,999,616 B2
(45) Date of Patent: Feb. 14, 2006

(54) INTERPRETATION OF COLORED DOCUMENTS

(75) Inventor: Peter Franciscus Marie Nacken, St. Michielsgestel (NL)

(73) Assignee: Océ-Technologies B.V., Venlo (NL)

( * ) Notice: Subject to any disclaimer, the term of this patent is extended or adjusted under 35 U.S.C. 154(b) by 692 days.

(21) Appl. No.: 09/924,509

(22) Filed: Aug. 9, 2001

(65) Prior Publication Data

US 2002/0039439 A1    Apr. 4, 2002

(30) Foreign Application Priority Data

Aug. 16, 2000 (NL) .................................... 1015943

(51) Int. Cl.
*G06K 9/00* (2006.01)
(52) U.S. Cl. ...................... 382/165; 382/170; 382/171; 382/176; 382/190; 382/224; 382/205; 358/2.99; 358/515; 358/462; 358/540; 345/442; 345/443
(58) Field of Classification Search ........ 382/162–173, 382/176, 177, 180, 181, 190, 198, 200, 224, 382/195, 209, 225, 227, 229, 205; 358/1.9, 358/412, 201, 2.99, 515, 3.2, 538, 462, 448, 358/465, 540, 500, 2.1; 345/619, 418, 670, 345/442, 443
See application file for complete search history.

(56) References Cited

U.S. PATENT DOCUMENTS

| | | | |
|---|---|---|---|
| 5,778,092 A * | 7/1998 | MacLeod et al. ............ 382/176 |
| 5,956,419 A * | 9/1999 | Kopec et al. ................ 382/159 |
| 6,266,439 B1 * | 7/2001 | Pollard et al. .............. 382/164 |
| 6,687,404 B1 * | 2/2004 | Hull et al. .................. 382/226 |
| 2002/0141641 A1 * | 10/2002 | Zhu ........................... 382/170 |
| 2003/0012438 A1 * | 1/2003 | Krtolica ...................... 382/173 |

FOREIGN PATENT DOCUMENTS

| | | |
|---|---|---|
| EP | 0684576 A2 | 5/1994 |
| EP | 629078 B1 | 6/1994 |
| EP | 910035 A1 | 4/1999 |

OTHER PUBLICATIONS

Koichi Sasakawa et al., "A Method for Threshold Selection in Binary Images Using mean Adjacent-Pixel Number", Systems & Computers in Japan, US, Scripta Technica Journals, New York, 22(3) : 66-73 (1991).
Karin Sobottka et al., "Identification of Text on Colored Book and Journal Covers", Institute of Informatics and Applied Mathematics University of Bern, NeubrÜckstrasse 10, CH 3012 Bern, Switzerland, 57-62 (1999).

* cited by examiner

*Primary Examiner*—Kanjibhai Patel
*Assistant Examiner*—Ali Bayat
(74) *Attorney, Agent, or Firm*—Birch, Stewart, Kolasch & Birch, LLP

(57) ABSTRACT

Automatic interpretation processing operations, such as character recognition, require a binary image of information-bearing image elements and a background. Digital image data produced by scanning a color-containing document frequently contain many different colors so that a division into information-bearing image elements and background is not evident. The invention divides connected components (contiguous pixels with the same color) in the digital image into background and other connected components, whereafter the other connected components are allocated, in accordance with a predetermined criterion, either to the background or to a foreground. The foreground connected components are combined into information elements suitable for the automatic interpretation processing. The division into information-bearing image elements and background can be preceded by a color quantisation processing of the digital image data.

22 Claims, 5 Drawing Sheets

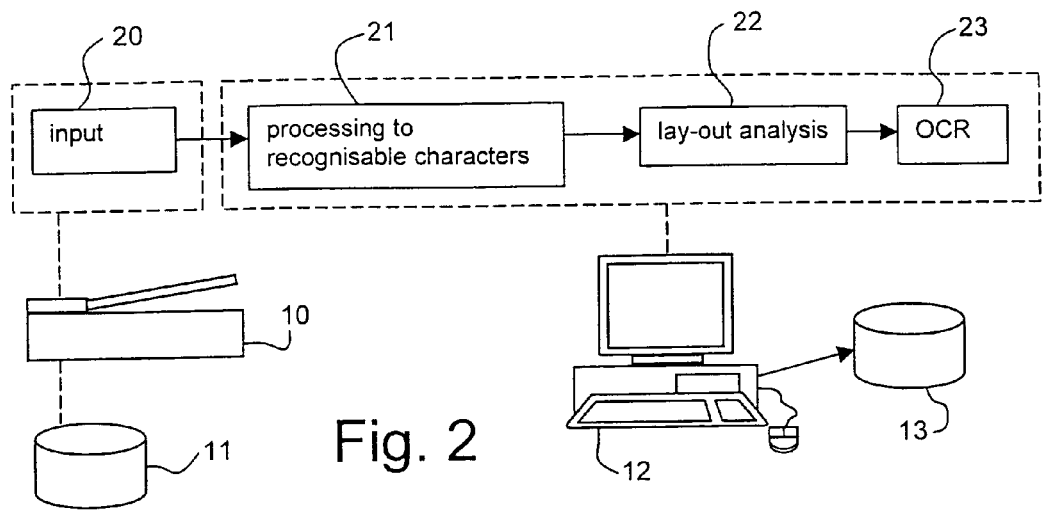
Fig. 1
Fig. 2
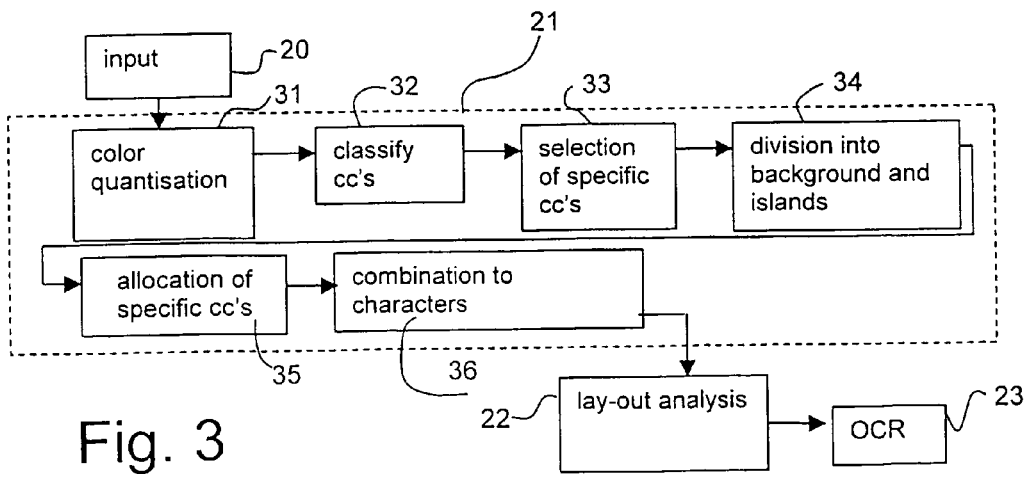
Fig. 3

INTERPRETATION OF COLORED DOCUMENTS

FIELD OF THE INVENTION

The invention relates to a method of extracting information elements in a colour-containing digital image for the purpose of automatic interpretation processing.

Such automatic interpretation processing is, for example, automatic lay-out analysis, automatic optical character recognition or automatic recognition of securities, and "information elements" denotes, for example: characters.

BACKGROUND OF THE INVENTION

The extraction of information elements from a black and white document image and a subsequent automatic lay-out analysis is known, for example, from European Patent Publication No. EP 0 629 078 B, although other methods are also known from the literature. Various other methods are mentioned in the introduction of the '078 patent publication.

The known methods are usually carried out by distinguishing, in a digital image formed, for example, by scanning a document with an electro-optical scanner, groups of contiguous pixels of the same colour ("connected components") in information-bearing (foreground) groups and background groups, and classifying the information-bearing groups into types such as (for example) characters, lines, photographs, etc. The information-bearing pixel groups, or a selection thereof, that correspond to a limited set of types, can then be extracted for a further interpretation processing.

Such methods are based on a binary image in black and white, i.e. an image of binary pixels. Such pixels have only two possible values: on or off, 0 or 1, white or black. The one possible value, for example black, is considered as information-bearing while the other value, i.e. white, is considered as non-information-bearing or background. These methods cannot be applied immediately to colour-containing digital images, because such images contain pixels with different colours which cannot immediately be divided up into the two classes of "information-bearing" and "background". Both the information and the background can in fact be coloured, while it is not known a priori which colour has which function.

In addition, a colour image also frequently contains errors, small areas with a deviant colour, as a result of the limited resolution of the scanner, noise and/or registration errors in the printing process of the scanned colour document. This manifests itself, for example, in pixels with a transition colour along the edges of characters. Reference should be made as an example to FIG. 1, which shows a detail of a scanned document image, wherein the pixels which have a wrong colour as a result of scanner errors are shown shaded.

Areas having a wrong colour give rise to problems because they disturb the interpretation process.

Coloured images often contain very many different colours. This also gives rise to problems in extraction processes, because all the colours occurring in the image must be divided up separately into information-bearing or background. It is therefore advantageous first to quantise the set of colours occurring in a document into a limited number of colour groups. Techniques for quantising colours are described in the literature, for example in Sobottka, K. et al.: "Identification of text on colored book and journal covers", Fifth International Conference on Document Analysis and Recognition, September 1999, pp. 57–62, and in commonly-assigned Netherlands patent application No. 1013669. In both documents the colour quantisation is carried out as a preparation for an interpretation process. According to these methods, the colours occurring in a digital image are grouped into a limited number of clusters and all the colours lying in a certain cluster are characterised by a colour code for that cluster. Locally there is then usually just a very small number of different colour codes left, so that a distinction between information elements and the background becomes much simpler.

However, this does not solve the problem of wrongly coloured areas along the edges of information elements, because they may be given different colour codes during quantisation, particularly if image elements having (practically) the same colour as the said "wrong" colour occur at other places in the image. Also, the quantisation may precisely give rise to a situation in which information elements are split up in components with different colour codes, so that an information element of this kind becomes completely unrecognisable as an entity for a further processing operation.

The mentioned Netherlands patent application proposes an after-treatment of the image subjected to colour quantisation, said after-treatment including establishing character contours by chain-coding. In this case a contour is constructed as a separation between the pixels having a colour code deviating from that of the surrounding background and the pixels with the colour code of the background. The further processing is then effected on the contours, without further looking at the original colour codes.

The disadvantage of this after-treatment method is that all the pixels deviating from the background colour are regarded as belonging to the information element or character, even if they actually belong to the background. Referring again to FIG. 1, this known method will extract the two digits as an entity and as a result errors can occur in an OCR process.

It should be noted that colour quantisation is only necessary if the image for processing contains many colours. If that is not the case, quantisation may be superfluous.

SUMMARY OF THE INVENTION

The invention, in part, provides improved processing of colour images so that automatic interpretation processing can achieve more accurate results.

To this end, the invention, in part, comprises the following steps:
  distinguishing, in the digital image, connected components formed of contiguous pixels with a same colour;
  dividing connected components into background connected components and other connected components and grouping contiguous said other connected components;
  allocating connected components belonging to a group of contiguous said other connected components to a foreground or to the background on the basis of a predetermined allocation criterion; and
  combining contiguous connected components allocated to the foreground and extracting a combined entity as an information element.

In one embodiment of the invention, the invention comprises a preparation step comprising:
  quantising the colours occurring in a digital image for processing, into a limited number of quantised colours.

This preparation step is necessary if the image for processing contains many different colours. This will often be the case. In that case, the term "colour" in this specification should be interpreted as "quantised colour".

In another embodiment, such an allocation criterion is based on a comparison of the colour of a connected component for allocation with the colours of the group of said other connected components of which the connected component for allocation forms part, and also with the colour of a background connected component which at least partially surrounds the connected component for allocation. More specifically, the colour of a connected component for allocation is compared with the average of the colours of the group of connected components of which the connected component for allocation forms part, and with the colour of the background connected component.

In yet another embodiment, the said other connected components are first divided up into types and only connected components of predetermined types are analysed with the allocation criterion.

The choice of the analysed component types is determined by the specific automatic interpretation processing and is intended to limit the number of connected components for analysis, to the benefit of processing time and the reliability of the processing operation. For example, if the interpretation process is character recognition, it will only be of interest to analyse those connected components which may possibly form part of a character.

The invention also relates to an apparatus in which the invention is applied. The invention, including the quantisation of colours of an image and also the combination of quantising of colours of an image and interpretation of that image, can be performed in a computer suitably programmed for the purpose and therefore also relates to a computer program and a storage medium on which the computer program is stored.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be explained with reference to the accompanying drawings wherein:

FIG. 1 shows a detail of a scanned colour image;

FIG. 2 is a diagram showing the environment for the use of the present invention;

FIG. 3 is a diagram of the constituent component parts of an apparatus according to the invention;

DETAILED DESCRIPTION OF PREFERRED EMBODIMENTS

Figure 4:
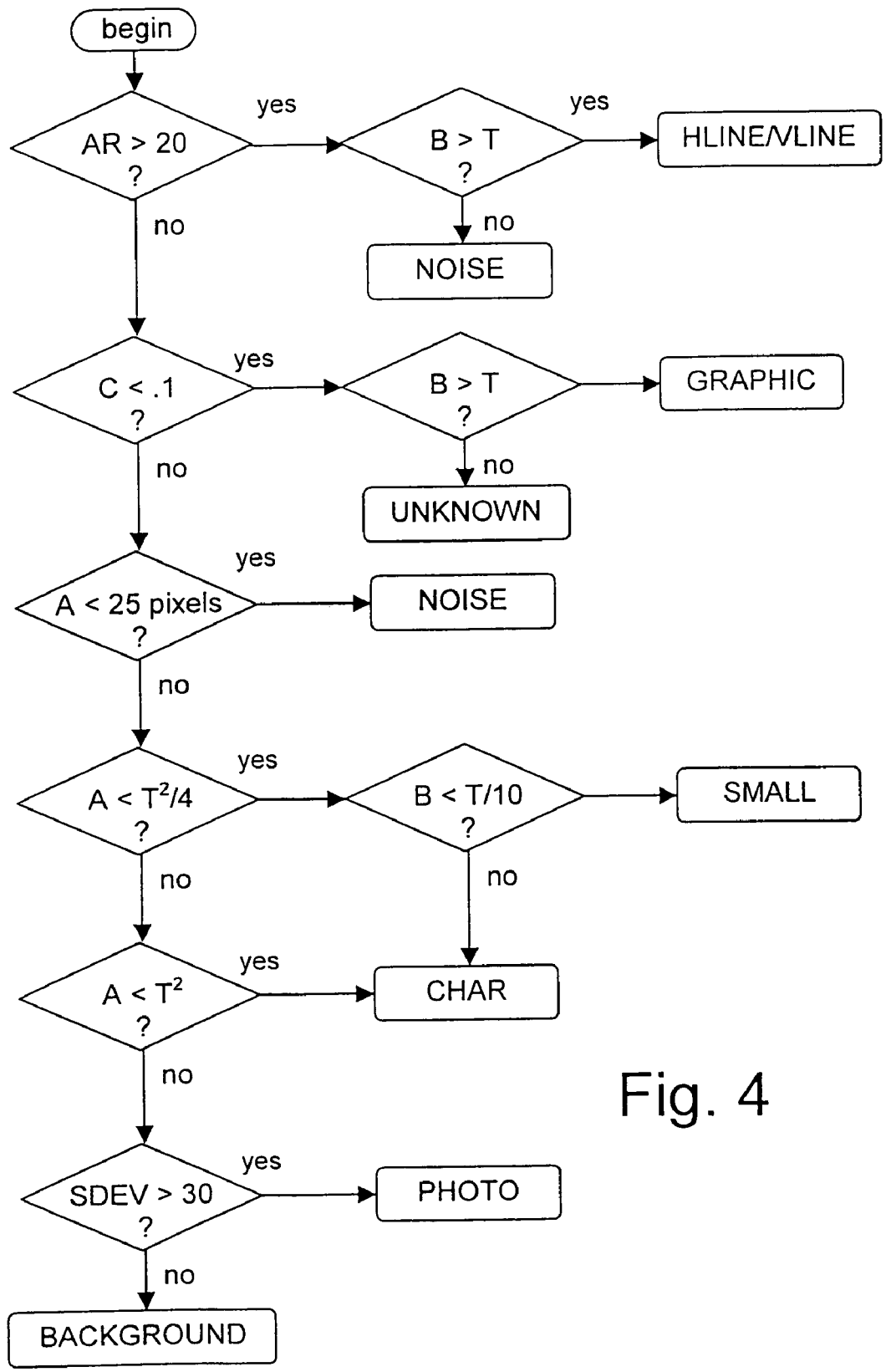
FIG. 4 is a decision diagram for the division of connected components into types.

FIG. 2 shows an environment in which the present invention can be fruitfully applied. The drawing shows an assembly of a source unit 20 for a digital colour image, for example an electro-optical scanner 10 for scanning a document or a storage unit 11 with scanning data, a preprocessing unit 21 according to the present invention, which extracts information elements, and one or more interpretation units, in this example a lay-out analysis unit 22 which establishes a mutual connection of information units and a character recognition unit (OCR) 23 which converts the text image thus found into text code, which can further be processed digitally. The units 21, 22 and 23 can be implemented in a suitably programmed computer 12. The results can, for example, be stored in a memory unit 13.

Characters cannot always be recognised easily in a scanned colour image. A colour scan in fact frequently contains many different colours, even if the scanned image has just a few (main) colours. Printing errors in the scanned document as a result of register errors in the printing process, and scanning errors as a result of noise and the limited resolution of the scanner may cause pixels of deviant coloration or small pixel areas which cannot be recognised and removed without difficulty. These areas having deviant coloration cause interpretation errors, and it is the function of the preprocessing unit 21 to extract information elements which are devoid of such disturbances.

The various parts of the preprocessing unit 21 are shown in FIG. 3 and comprise the following modules:
- a colour quantisation module 31 for reducing the number of colours in the image to a limited number,
- a classification module 32 for inventorisation (making an inventory) of the connected components occurring in the image and dividing the same into types,
- a selection module 33 for selecting the connected components of specific types,
- a division module 34 for dividing the selected connected components into background connected components and non-background connected components and grouping the latter in islands of contiguous connected components,
- an allocation module 35 for allocating the connected components of an island to the foreground and the background, and
- a combination module 36 for combining the connected components of an island which belong to the foreground, to form an information element.

The operation of these modules will now be described.

The colour quantisation module 31 is intended to allow a division into foreground and background elements. Colour alone for this purpose, of course, is an inadequate criterion and hence each connected component must be considered as potentially information-bearing. Since 24 bits are used for describing a colour in a digital colour image, a scanned colour image will very quickly contain a large number of different colours. The number of colours is greatly reduced by colour quantisation.

There are various methods of quantising colours. The commonly-assigned Netherlands '669 patent application (mentioned above) describes a method wherein the colour space is divided up into a small number of compartments each containing a concentration of colours present in the image. All the colours in a compartment receive the same colour code. In Sobottka, K. et al. (also mentioned in the Background section): "Identification of text on colored book and journal covers", Fifth International Conference on Document Analysis and Recognition, September 1999, pp. 57–62, it is proposed to prepare a three-dimensional histogram of colours. For each histogram cell a pointer to the highest neighbouring cell is then established. In this way, around each local maximum in the histogram there is defined an area which is allocated a colour code in its entirety.

Only two colour quantisation methods have been described here, but more are known. The choice of the method is arbitrary and does not represent a point of novelty per se of this invention.

The colour quantisation module 31 delivers a digital image with a limited number of colours to the classification module 32, which classifies all the pixels of the digital image into connected components and divides the connected components up by type. A connected component is a group of contiguous pixels with the same colour code. A bounding box is placed around each connected component, said box being the smallest rectangle fitting around the connected component.

The following attributes are then measured for each connected component:
- the co-ordinates of the top left-hand corner (x0, y0) and the bottom right corner (x1, y1) of the bounding box,
- the size (the number of pixels of the connected component),
- the colour code of the connected component, and
- the average value and the standard deviation SDEV of the (actual) colours in the connected component.

The following properties of the connected component are calculated from these attributes:
- the width,
- the height,
- the area A,
- the largest dimension B (=max (width, height)),
- the smallest dimension S (=minimum (width, height)),
- aspect ratio AR (=(largest dimension)/(smallest dimension)), and
- the degree of coverage C, i.e. the covered part of the bounding box (=size/(width x height)).

Using the properties thus calculated, a connected component is divided up into one of the following types:

| | |
|---|---|
| NOISE: | small element without meaning |
| HLINE: | (part of) a horizontal line |
| VLINE: | (part of) a vertical line |
| SMALL: | small character or part of a character |
| CHAR: | character |
| PHOTO: | (part of) a photograph |
| GRAPH: | graphic element |
| BACKGR: | large homogenous background field |
| UNKNOWN: | not definable |

The classification is performed by a decision tree shown in FIG. 4. This drawing is largely self-explanatory. Use is made of a preselected threshold value T in a number of steps. The value of this can be determined experimentally. The value 3.5 mm, a character size frequently used in documents, appears to be quite satisfactory. The other threshold values indicated are also intended solely as an example.

Only connected components of predetermined types are selected for the further processing.

The choice of these types is dependent on the specific interpretation processing which follows. In this example, character recognition is applied as interpretation processing. This requires only those connected components which can themselves be a character or a part thereof, namely CHAR, NOISE, SMALL and UNKNOWN. Also, the connected components of type BACKGR are selected. The selection concerned is performed by the selection module 33, which passes the selected connected components to the dividing module 34.

The dividing module 34 groups connected components that are not of the background type into what are known as "islands", an "island" being an entity of contiguous connected components. The "islands" are passed to the allocation module 35, which establishes which connected components belong to the information element. An "island" of course usually contains a number of connected components of which part belongs to an information element and another part to the background.

Figure 5:
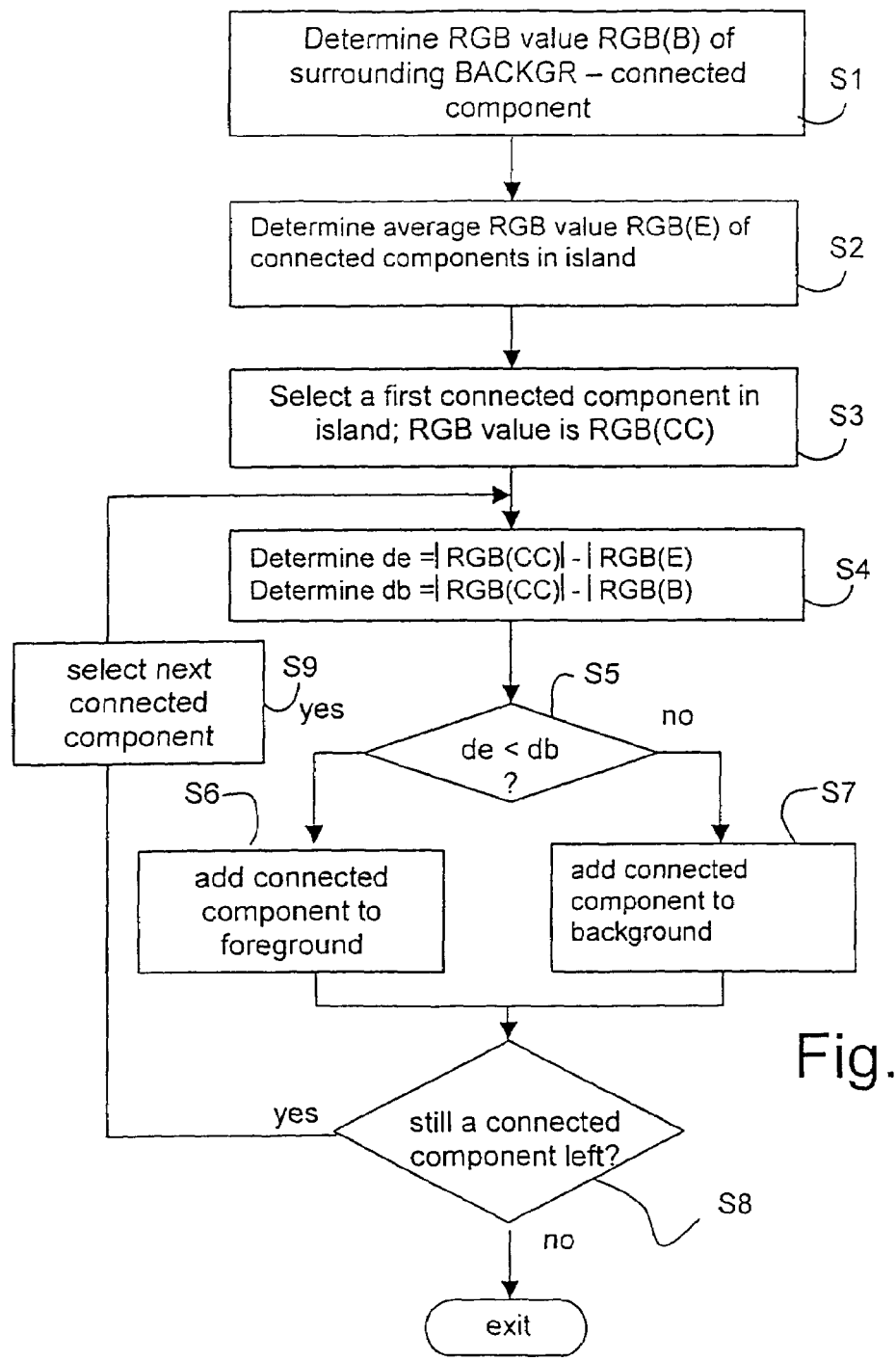
FIG. 5 is a flow diagram of the operation of the allocation module according to the invention.

The allocation module 35 performs a procedure shown in FIG. 5 and based on a predetermined allocation criterion with respect to the colours of "island" and surrounding background. According to the allocation criterion, a connected component is allocated to a foreground (information-bearing) or the background (non-information-bearing).

In a first step S1, the RGB value of the background component surrounding the "island" is determined. If the "island" is situated just at the boundary of two or even more background components, then in this step the average RGB value of the surrounding background components is calculated, for example by simple averaging of the R, G and B values respectively. It is also possible in this case to use a weighted average, for example by area.

In step S2 the average RGB value of the connected components in the "island" is then calculated, for example simply by averaging the R, G and B values respectively. Here again a weighted average can be used, for example by area.

For each connected component (steps S3, S8, S9) the actual allocation procedure (S4–S7) is then performed. In step S4, the distances in the colour space between the RGB value of the investigated connected component, and the (possibly average) RGB value of the background and the average RGB value of the "island", respectively, are then calculated. These distances are compared (S5) and the investigated connected component is allocated to the foreground if the distance from the "island" value is less than the distance from the background value (S6), and to the background in the other case (S7).

In this example, the RGB value of an element refers to the RGB value of the quantised colour thereof. In an alternative form, the average RGB value of the original colours of all the separate pixels of an element of this kind could also be used for this purpose.

Finally, the results of the allocation are passed to the combination module 36, which combines the foreground connected components into separate information units. These are passed with their positions to the interpretation units.

Now that all the elements in the digital image have been divided into two categories, namely foreground and background, the conventional interpretation processing operations can be applied, in this example lay-out analysis, followed by character recognition. Lay-out analysis is described, for example, in EP 0 629 078 B and in other documents, some of which are mentioned in the introduction of EP 0 629 078 B. This processing does not represent a point of novelty per se of the present invention.

Figure 6A:
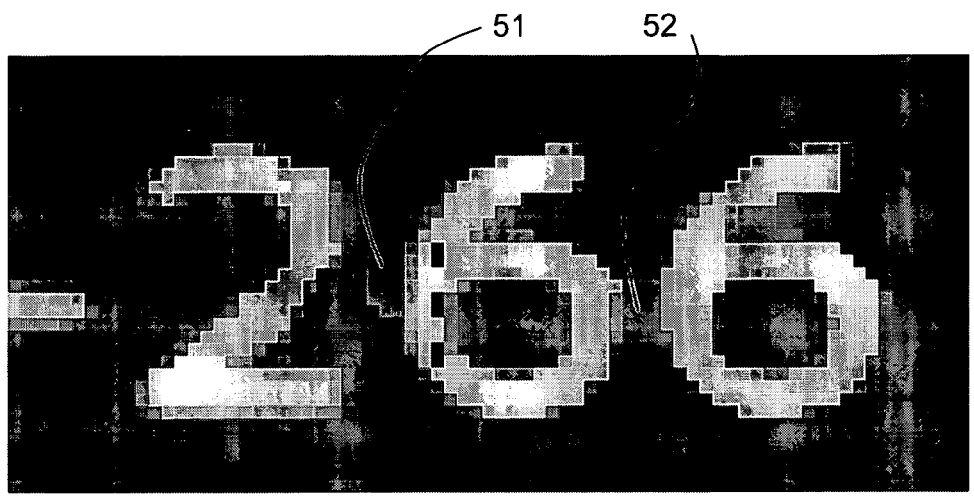
FIGS. 6A, B, C and FIGS. 7A, B, C show digital images in different stages of processing.
Figure 7A:
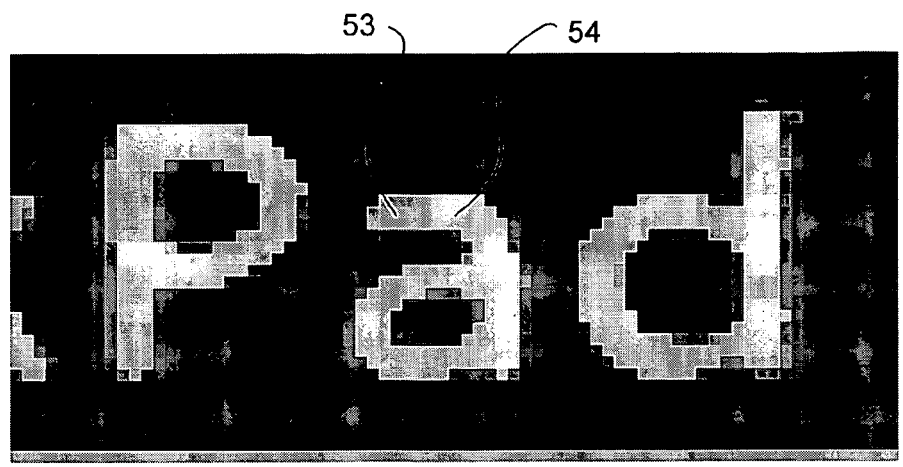

Examples of the operation of the preprocessing unit 21 as described above are shown in FIGS. 6A, B and C and FIGS. 7A, B and C. FIG. 6A shows a highly magnified portion of a scanned image. The grey tints in the drawing indicate different colours, some of which differ from one another only slightly. It is not possible for an automatic machine to determine a priori what pixels are information-bearing and which are not, although a human observer has no difficulty whatsoever in this connection. If all the pixels with a colour deviating from the background were to be allocated to the foreground, hence to the information element, the three imaged digits would form an entity, because there are "bridges" (51, 52) of pixels with a transition colour between the separate digits. These transition colours are the result of the limited resolution of the scanner, so that at the edges of the digits, pixels are generated with a grey tint which correspond to the average grey value of the partially white and partially black pixel. Furthermore, the optical system of the scanner causes blurring of the transitions between the foreground and the background, resulting in the said "bridges".

Figure 6B:
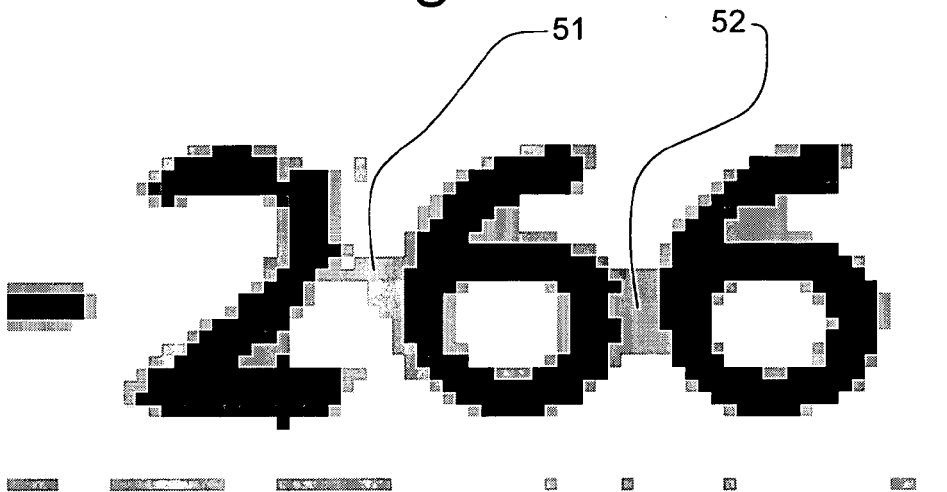

The scanning data are then subjected to a colour quantisation in the module 31, and the result of this is shown in FIG. 6B. The different grey tints in this figure correspond to different quantised colours. It is clearly visible that the boundaries of the digits still contain different colours and that the quantisation in this case has also not resulted in elimination of the "bridges" 51, 52. Despite the limitation in the number of colours further automatic interpretation is still not satisfactorily possible.

Figure 6C:

FIG. 6C shows the result of the modules 32–36, from which it will be clear that all the disturbances have now been removed so that the scanning data are now suitable for further interpretation.

Figure 7B:
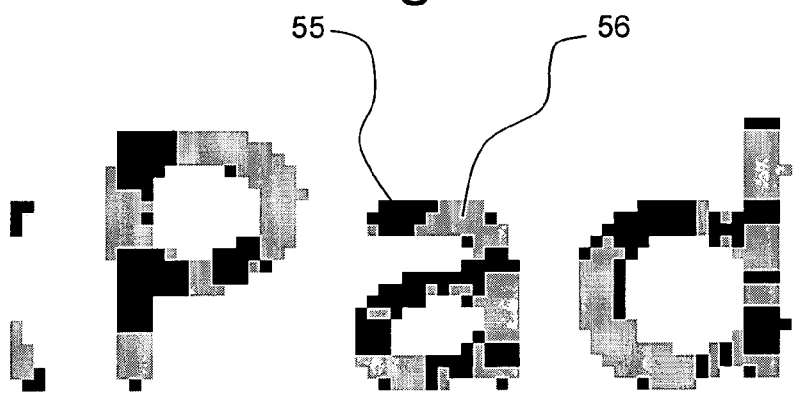

FIG. 7A shows another disturbance of the scanning data. In this, colour differences are present in the characters, for example as visible in the top part of the letter "a", which includes two differently coloured parts 53, 54. During the subsequent colour quantisation, these different colours appear to be quantised in different colour codes 55, 56 (FIG. 7B). This division can occur when the average colour of a character is just at the boundary of two quantised colours. Very small colour differences in the scanned image of the character can then just exceed the limit and then cause first one and then the other quantised colour to be selected.

Figure 7C:

This effect makes automatic interpretation completely impossible, because there are now not even any basic forms available in a single colour. However, during the processing in the modules 32–36, the differently coloured fragments nevertheless appear to be combined to the correct character forms (FIG. 7C).

Although the invention has been explained by reference to the above description, it is not limited thereto. The skilled man will realise that alternative embodiments are possible within the scope of the following claims. These alternative embodiments are considered as coming within the scope of protection of the patent.

The invention claimed is:

1. A method of extracting information elements from a colour-containing digital image, the method comprising:
   distinguishing, in the digital image, connected components formed of contiguous pixels with a same colour;
   dividing connected component into background connected components and other connected components and distinguishing groups of said other connected components, a group being formed by contiguous connected components that are not separated from each other by pixels belonging to a background connected component;
   allocating connected components belonging to a group of said other connected components to a foreground or to the background on the basis of their respective colours; and
   combining contiguous connected components allocated to the foreground and extracting a combined entity as an information element.

2. The method according to claim 1, also comprising a preparation step which comprises:
   quantising the colours occurring in a digital image for processing, into a limited number of quantised colours, and replacing colours originally occurring in the image signals by quantised colours.

3. The method according to claim 1, wherein
   said allocation criterion is based on a comparison of the colour of a connected component for allocation with the colours of a group of said other connected components of which the connected component for allocation forms part, and also with the colour of a background connected component which at least partially surrounds the connected component for allocation.

4. The method according to claim 3, wherein
   said allocation criterion is based on a comparison of the colour of a connected component for allocation with the average of the colours of the group of connected components of which the connected component for allocation forms part, and also with the colour of the background connected component.

5. The method according to claim 4, wherein
   said allocation criterion is as follows: when the colour of a connected component for allocation corresponds more to the average of the colours of the group of connected components of which the connected component for allocation forms part than to the colour of the background connected component, the connected component for allocation is allocated to the foreground.

6. The method according to claim 1, wherein said other connected components are first divided into types on the basis of their properties and wherein only connected components of predetermined types are analysed with the said allocation criterion.

7. A method of automatically interpreting a colour-containing digital image, the method comprising:
   extracting information elements from the colour-containing digital image according to claim 1; and
   performing an automatic interpretation processing on the basis of the extracted information elements.

8. The method according to claim 7, wherein the automatic interpretation processing comprises a lay-out analysis.

9. The method according to claim 7, wherein the automatic interpretation processing comprises a character recognition.

10. The method according to claim 7, wherein the automatic interpretation processing comprises a recognition of graphic elements in the image.

11. An apparatus for extracting information elements from a colour-containing digital image, the apparatus comprising:
    receiving means for receiving digital image signals corresponding to a colour-containing image;
    a classification module for distinguishing connected components formed of contiguous pixels with the same colour in the digital image signals;
    a dividing module for dividing connected components into background connected components and other connected components and distinguishing groups of said other connected components, a group being formed by contiguous connected components that are not separated from each other by pixels belonging to a background connected component;
    an allocation module for allocating connected components to a foreground or to the background on the basis of their respective colours; and a combination module for combining contiguous connected components allocated to the foreground and extracting a combined entity as an information element.

12. The apparatus according to claim 11, also comprising a colour quantisation module for quantising colours occurring in the digital image signals for processing into a limited number of quantised colours and replacing colours originally occurring in the image signals by quantised colours.

13. The apparatus according to claim 11, wherein said allocation criterion is based on a comparison of the colour of a connected component for allocation with the colours of a group of the said other connected components of which the connected component for allocation forms part, and also with the colour of a background connected component which at least partially surrounds the connected component for allocation.

14. The apparatus according to claim 13, wherein the said allocation criterion is based on a comparison of the colour of a connected component for allocation with the average of the colours of the group of connected components of which the connected component for allocation forms part, and also with the colour of the background connected component.

15. The apparatus according to claim 14, wherein said allocation criterion is as follows: when the colour of a connected component for allocation corresponds more to the average of the colours of the group of connected components of which the connected component for allocation forms part than to the colour of the background connected component, the connected component for allocation is allocated to the foreground.

16. The apparatus according to claim 11, wherein the classification module is provided with means for classifying said other connected components on the basis of their properties into types and
wherein a selection module is provided for selecting connected components of predetermined types and passing only the selected connected components to the dividing module.

17. An apparatus for automatically interpreting a colour-containing digital image, the apparatus comprising:
an apparatus for extracting information elements from the colour-containing digital image according to claim 11, and
an interpretation unit for performing an automatic interpretation processing on the basis of the extracted information elements.

18. The apparatus according to claim 17, wherein the automatic interpretation processing comprises a lay-out analysis.

19. The apparatus according to claim 17, wherein the automatic interpretation processing comprises character recognition.

20. The apparatus according to claim 17, wherein the automatic interpretation processing comprises recognition of graphic elements in the image.

21. A computer program product with program code stored on a machine-readable medium, for performing the method according to claim 1.

22. A computer program product with program code stored on a machine-readable medium, for performing the method according to claim 7.

* * * * *